United States Patent [19]

Stepp

[11] 4,203,707
[45] May 20, 1980

[54] WINDMILL WITH AUTOMATIC FEATHERING CONTROL AND STORM PROTECTION

[76] Inventor: William J. Stepp, 4241 Park Ave., Lake Station, Ind. 46405

[21] Appl. No.: 727,352

[22] Filed: Sep. 28, 1976

Related U.S. Application Data

[63] Continuation-in-part of Ser. No. 530,830, Mar. 3, 1975, abandoned.

[51] Int. Cl.² ............................................. F03D 7/06
[52] U.S. Cl. ......................................... 416/119; 416/41
[58] Field of Search ............... 416/119, 111, 109, 110, 416/41

[56] References Cited

U.S. PATENT DOCUMENTS

| 321,292 | 6/1885 | Hatfill | 416/119 |
|---|---|---|---|
| 410,361 | 9/1889 | Harbaugh | 416/119 |
| 697,403 | 4/1902 | Groombridge | 416/119 |
| 866,836 | 9/1907 | Bell | 416/41 |
| 1,419,000 | 6/1922 | Wilson | 416/111 |
| 1,626,313 | 4/1927 | Tuckey | 416/118 |
| 2,247,929 | 7/1941 | Terhune | 416/46 |
| 2,406,268 | 8/1946 | Terhune | 416/119 X |
| 2,457,514 | 12/1948 | Wood | 416/41 |

FOREIGN PATENT DOCUMENTS

23639 12/1921 France ............................ 416/117

Primary Examiner—Everette A. Powell, Jr.

[57] ABSTRACT

A windmill of the vertical axis type having a plurality of circumferentially-spaced rotatably-mounted vanes wherein means are provided for controlling the feathering of the vanes so that, upon feathering they rotate in a direction opposite to that rotation of the windmill assembly, wherein means are provided to assure that the entire assembly heads up into the wind, and wherein means are provided for disengaging of the entire vane assembly when the wind velocity reaches a predetermined value.

5 Claims, 7 Drawing Figures

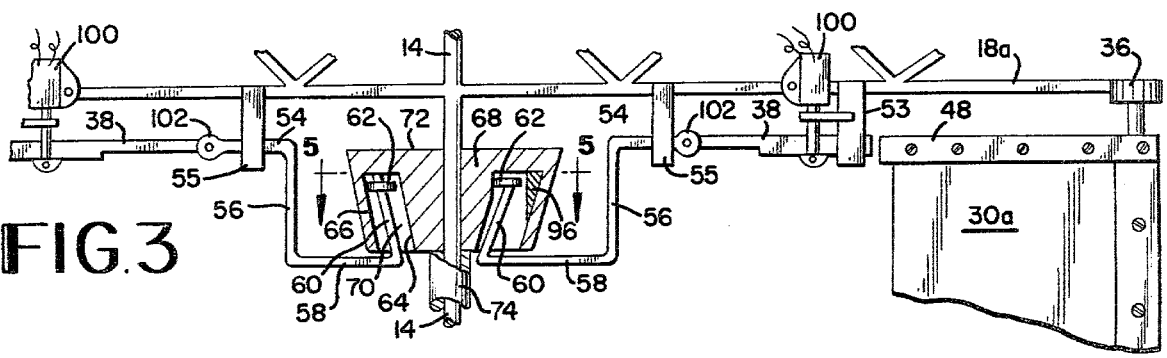
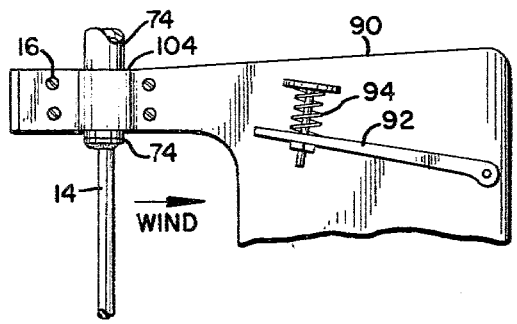
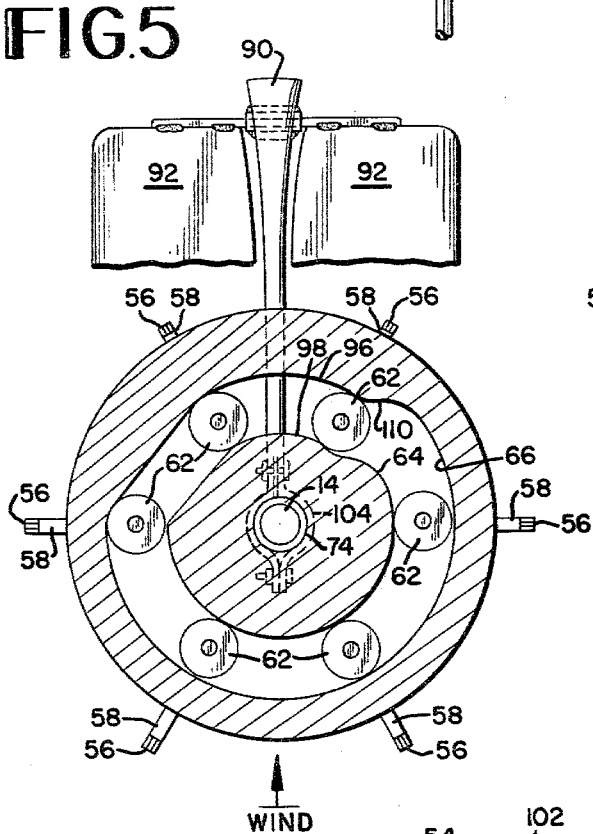
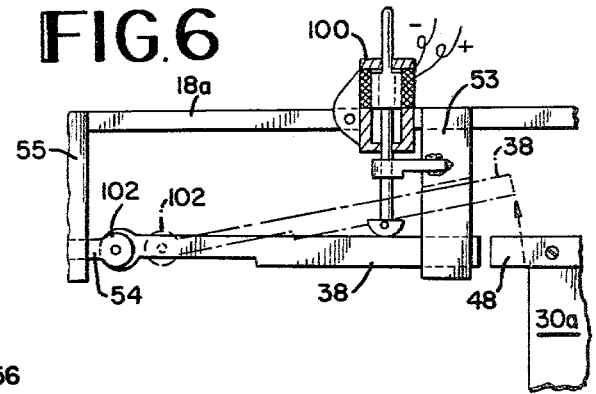
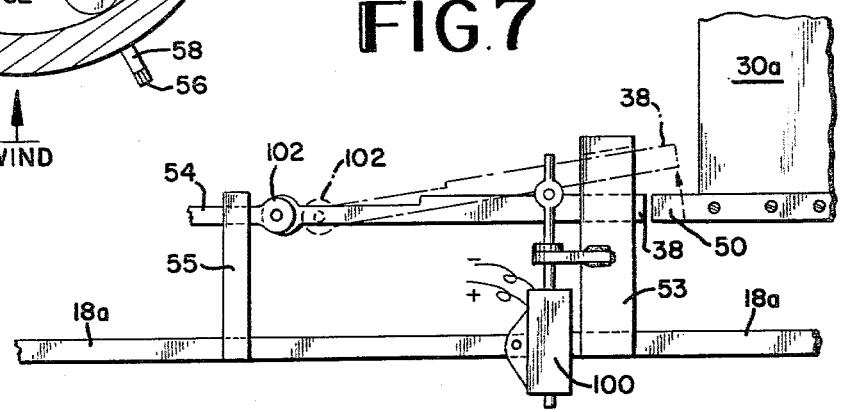

4,203,707

WINDMILL WITH AUTOMATIC FEATHERING CONTROL AND STORM PROTECTION

This application is a continuation-in-part of co-pending application Ser. No. 530,830, filed Mar. 3, 1975, now abandoned.

SUMMARY

The windmill of the present invention distinguishes over the prior art. Because of these novel features vibration is reduced to a minimum and rotation at excessive speed is precluded. As the vane assembly rotates about a central mast it defines, in plan view, a power side and a feathered side. The vanes are directed downwind on the power side of the mast and are feathered to be propelled upwind as they traverse the downwind arc of the circular path in which the vanes travel. The vanes are caused to feather in a direction counter to the direction of rotation of the vane assembly by means releasing the vanes just prior to their reaching a complete downwind position. Considering the apparatus from above, the vanes rotate from a zero angular position with respect to the direction of the wind progressively to a position in which they are broadside to the direction of the wind and continue to diminish their angular positions to within a few degrees of zero, at which time the vanes are released in response to movement of the cam followers of a cam mechanism. By this arrangement the vanes are feathered in a direction opposite to the direction of rotation of the vane assembly, thereby precluding the deleterious effects of normal backward feathering with consequential vibration and shock resulting from the momentary backward pressure of the wind on the backside of the vane. The cam assembly is rotatably held to a position with respect to the wind direction as to assure the vane release relationship above described by means of a wind directional vane or fin assembly which is also effective in raising the cam assembly to a position in which the cam followers are all effectual simultaneously permitting the vanes to swing freely and the windmill is deactivated. As understood, this latter function is for the purpose of preventing damage to the windmill in the event of high velocity winds. When the wind gusts recede to safe velocity, the fin and cam assemblies lower by gravity and reactivation of the windmill is initiated.

DESCRIPTION OF THE PREFERRED EMBODIMENTS

FIG. 3 is an enlarged fragmentary elevational view illustrating a cam assembly for unlatching each individual vane as it approaches a predetermined angular position to the direction of the airflow to effect rotation of each individual vane, as illustrated in FIG. 1, in a clockwise direction as the entire assembly rotates in a counterclockwise direction.

FIG. 4 is a fragmentary enlarged view of the structure of FIG. 2 illustrating the wind direction vane or fin-vane and the manner in which this wind fin causes the entire assembly to head up into the wind.

FIG. 5 is a sectional plan view taken substantially on line 5—5 of FIG. 3.

FIG. 6 is an enlarged fragmentary elevational view of a modified form of the present invention illustrating the latching mechanism in conjunction with the hinged end bar of the latch linkage as it is associated with the solenoid.

FIG. 7 is fundamentally the same as FIG. 6 except illustrating how the same mechanism in FIG. 6 is adapted to the lower counterpart of FIG. 6 as adaptive to the bottom structure of the windmill.

DETAILED DESCRIPTION OF THE INVENTION

Figure 1:
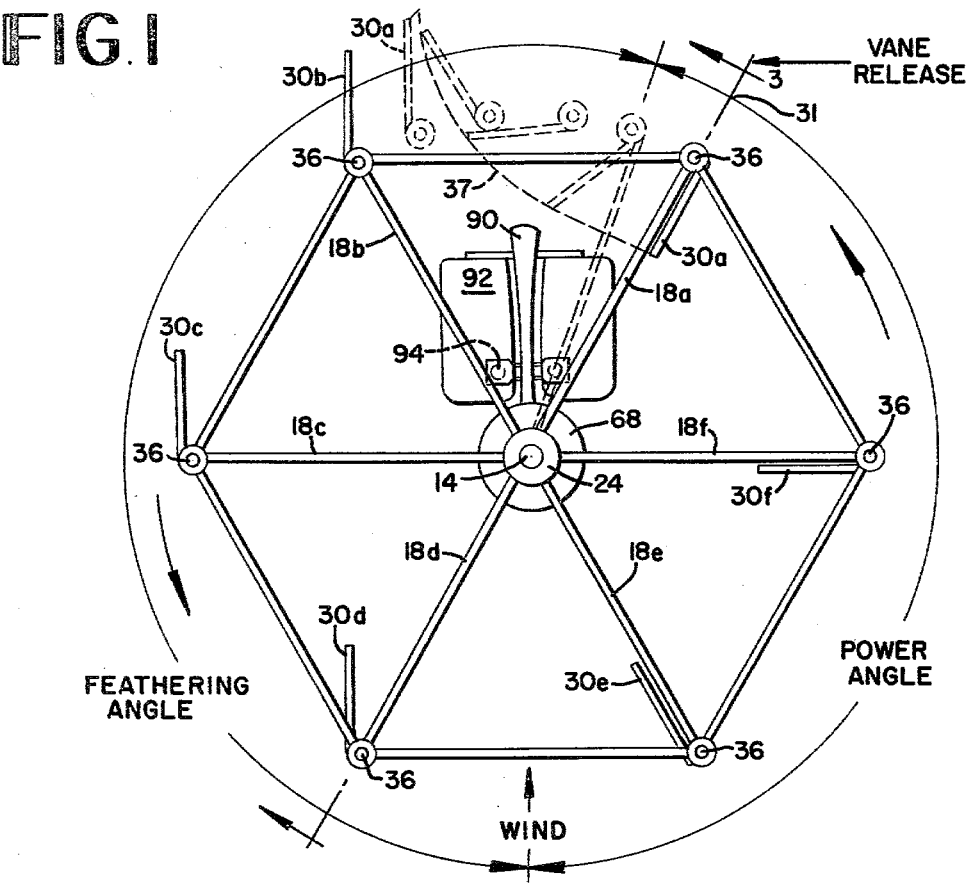
FIG. 1 is a plan view of the windmill of the invention illustrating the varying positions of the vanes at different phases of rotation of the vane assembly.
Figure 2:
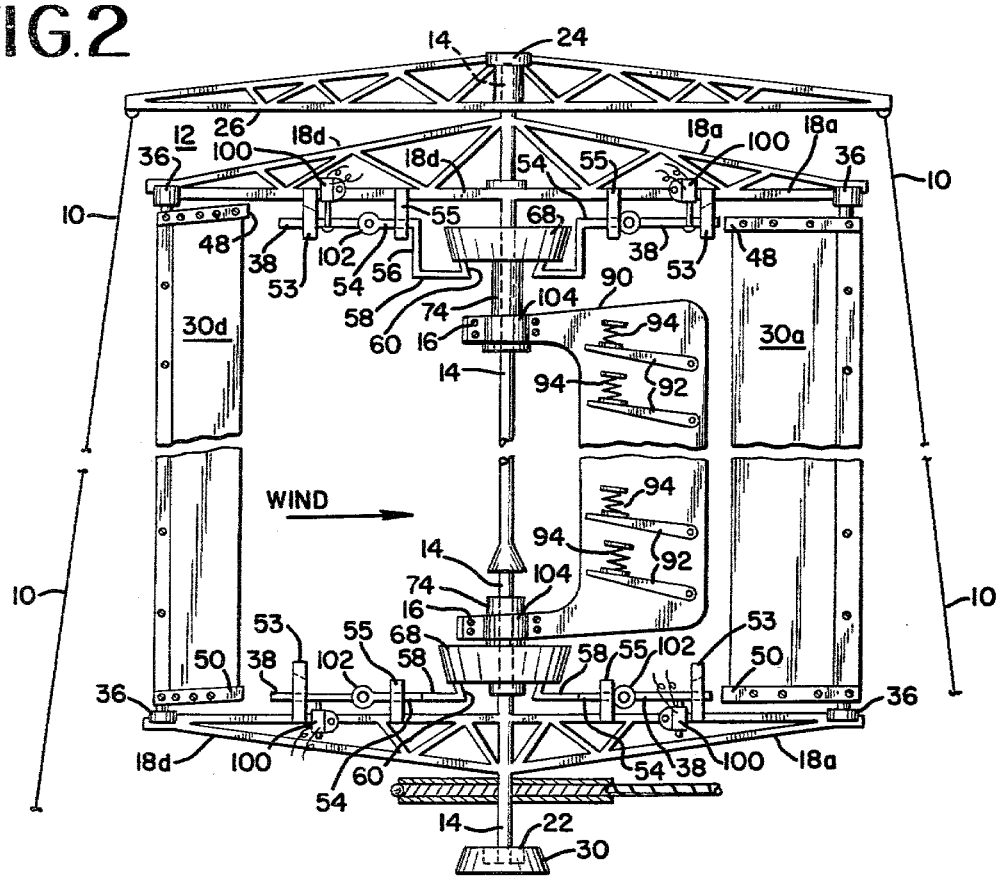
FIG. 2 is an elevational view of the vane assembly of the windmill made in accordance with the present invention and illustrates a general view of the mechanics of the prefeathering machinery, as viewed from line 3—3 in FIG. 1.

Referring now to the drawings, and more particularly to FIGS. 1 and 2, the windmill of the present invention is indicated generally by reference to a vane assembly indicated by numeral 12, mounted for rotation about a vertical axis 14. The curved arrows in FIG. 1 indicate that the vertical assembly is rotating in a counterclockwise direction while the individual vanes feather in a clockwise direction. This is arbitrary and could be clockwise and counterclockwise respectively if desired.

FIG. 1 illustrates the windmill of the invention as illustrated from above. At the extremities of each of the arms 18a, 18b, 18c, 18d, 18e, and 18f and their inverted counterpart arms at the bottom are a series of vanes 30a, 30b, 30c, 30d, 30e, and 30f. On each of said vanes is a pivot point 36. The wind fin vane 90 is shown in its constant downwind position, flanked on each side by its lifting ailerons 92.

Referring now to FIG. 3 there is illustrated therein an arm 18a, having a vane 30a pivotally connected thereto at pivot point 36. On each of the several vanes is a pivot point 36. As the vane assembly rotates in a counterclockwise direction, the several vanes move sequentially and progressively as illustrated, in a clockwise direction about pivot point 36 starting at 31. The free edge of the vane describes a path illustrated by a dotted line indicated by numeral 37. It will be noted that each vane rotates in a clockwise direction about pivot point 36 while feathering, as the vane assembly rotates in a counterclockwise direction. This is an important feature of this invention since it eliminates vibration and shock which will tend to destroy the vane assembly. In FIG. 2 the vane assembly 12 is illustrated as being mounted on a base 30 containing a journal 22 for reception of the lower end of mast 14. It will be appreciated that the base 30 is fixed to any suitable firm surface and the entire structure is held erect by a plurality of guy wires 10 attached to the outer ends of adjoined trusses 26 which form a common juncture at their centers around journal 24 which receives the upper end of mast 14 on which the entire vane assembly rotates; the lower ends of the guy wires are anchored to the same firm surface as is base 30.

Another feature of the present invention provides for latching of the vanes by means of a plurality of latch assemblies 38. Only one such is shown in detail.

Each latch assembly includes a radially outwardly extending bar 54 with a latch 38 attached to the outer end by hinge 102. Connected to the inner end of bar 54 is a downwardly extending rod 56 to the bottom of which is connected a radially inwardly extending rod 58. Rod 56 is obviously eliminated in the lower linkage assembly. A rod 60 extends upwardly from the end of rod 58 and to the upper end of rod 60 is secured a cam-follower 62 which follows a contour of the inner cam wall 64 and the outer cam wall 66. See FIG. 5 in conjunction with FIG. 3. The cam assembly as indicated generally by reference numeral 68 includes a top cover 72, an inner wall 64 and an outer wall 66 cooperating to form a conical track 70. In normal operation, the bar 38 of the latch assembly extends radially outwardly in front of the corner projections of the vane, 48 and 50 at the top and the bottom of the vane respectively which is part of the inner edge of each of the vanes and prevents rotation of the vanes before feathering time. Each bar 54 and 38 is slidably received in an apertured support 55 and 53 respectively, the latter affording both horizontal and vertical movement of latch bar 38.

The entire latch assembly is pulled radially inwardly in response to centripetal movement of the cam-followers 62 in the cam track 70 to move the bar 54 and the attached latch 38 inwardly as viewed in FIG. 3, occurring when said cam followers pass lobe 96 beginning at point 110 which comprises part of the outer cam wall 66.

As above described, the vanes advance to within a few degrees of zero angularity with the direction of downwind at which time the cam actuated latch assembly is activated, which allows the free inner edge of the vane to blow on through past the withdrawn latch 38 and begin its feathering in a smooth swivel turn as it traverses the downwind arc of its circular travel. It will be appreciated that the second cam assembly at the bottom of the vane assembly is synchronized with the cam assembly at the top for rotation around the shaft 14, by the rigidity of the fin-vane 90 attached to each cam assembly 68 at sleeves 74 by clamping. The sleeves 74 are component parts of the cam assemblies. The top sleeve extends inferiorly from the top cam assembly but the bottom cam assembly has its sleeve extending superiorly; the difference is necessitated to accommodate fastening both assemblies to the wind direction vane 90 or fin vane as it may be called.

It is thus apparent that both cam assemblies will rotate about the shaft 14 in unison. This facilitates unlatching both the top and the bottom of the vanes at the same moment. Furthermore, means are provided for elevating the entire wind-direction-fin-vane 90 and cam assemblies in the event that the wind speed exceeds a predetermined velocity. This means includes ailerons 92 pivotally connected to the fin 90 so as to rise when strong wind gusts occur, in opposition to spring 94, to raise the assemblies so that the cam followers 62 ride below the cam lobe 96, in the lower and smaller diameter section of cam track 70. See FIG. 3. Thus, all latch linkage is pulled inward letting all vanes feather and the windmill ceases to rotate.

The latch 38 may, if desired, be electronically operated, as by solenoid 100 to move the outer end of the said hinged latch 38 upwardly to the elevated position illustrated in dot-and-dash lines in FIGS. 3, 6, and 7. It will be understood that the solenoid would be energized by activation of a cam-associated switch mechanism (not shown) to release each vane at the desired moment. Elementary circuitry is provided to the solenoids from an electrical source of power (not illustrated).

The release point for the releasing activation of latches 38 may be adjusted by rotating the clamping assemblies 104 of the wind fin vane 90 about sleeves 74 when bolts 16 are loosened.

It will be noted that the cam track 70 has a lobe 96 and a curved corresponding section 98 in confronting relation to element 96 so as to guide the cam followers and effect the release cycle. Feathering of the vane begins when the associated follower 62 reaches the lobe 96 at point 110, the latch 38 is activated and drawn radially inwardly, thus precluding normal backward feathering. When the latches 38 are clear of the inward projections of the vanes, 48 and 50, the vane is released and allowed to feather clockwise. It will be seen, therefore, the pressure of the wind continues on the power side of the vane even through the control phase of its feathering which is the first 90 degrees of its swivel. The consequent pressure on the vane in the first 90 degrees of the feathering process beneficially adds continuing power to said vane for a brief period of time, effecting continued torque to the forward rotation of the windmill. However, if the same windmill, although functional, is allowed to feather backwardly, uncontrolled, with latches not withdrawn inwardly, a reverse power is monentarily applied to the vane in its backward feathering and a resultant jerk on the entire windmill ensues, giving rise to destructive and severe vibration. Since the feathering process attains enough speed in the first half of its 180 degrees swivel, pressure and backlash on the apparatus is negligible in the second half.

As the vane completes its feathering, the air cushioning of the windstream, limited in velocity to the windmill's accepted tolerance predetermined by the adjusted lifting capacity of ailerons 92, obviates any necessity of any kind of shock absorbers.

I claim:

1. In a windmill of the vertical axis type there is a vertical rotatable tubular center shaft mounted on a thrust bearing at the bottom end in a base and held erect by a thrust and a stabilizing bearing at the top positioned in the center of two or more intersecting trusses of which the outer ends extend beyond the periphery of the windmill and connected to guy wires or cables which are in turn anchored to the medium which holds the base, said tubular shaft having affixed thereto a plurality of radial arms, one set of arms located a few feet above the base bearing and another set spaced above the lower set and near the trusses at the top and so affixed to the tubular center shaft as to be geometrically congruent to the radial arms below, there being a swingable wind power blade suspended between each pair of the upper and lower matching radial arms, said blades vertical and parallel to the tubular center shaft of the windmill and journaled in bearings at the outer ends of the radial arms, said bearings receiving the ends of the axis posts of the swingable blades enabling each blade to rotate three hundred sixty degrees horizontally on its axis post during each rotation of the windmill, said type of windmill equipped with cam means provided to cause each blade to feather into a rotation opposite in direction to the rotation of the windmill by the last significant remaining wind pressure on the pressure side of the blade before feathering, said means consisting of the machinery of an apparatus comprised of two identical inverted frustum bodies or conical cam cups each encircling the center shaft and supported by thrust bearings in collars thereon, one of said bodies within a few inches of and below the top of the space provided between the upper and lower radial arms, its counterpart located near the bottom of said space, said bodies having been bored through vertically at their centers admitting sleeves firmly affixed therein, said sleeves slidably fit around the tubular center shaft of the windmill affording both vertical and rotational movement around the vertical center shaft, the sleeve of the upper frustum body extending a short distance inferiorly therefrom and the sleeve of the lower frustum body extending superiorly up and around the center shaft a short distance, said bodies rigidly connected one to the other by a directional control wind vane adjustably clamped to both sleeves, maintaining a rigid constant relationship to cams one to the other within the frustum bodies in both vertical and rotational movement around the center shaft, movable in unison, such rigidity effected by the aileron-equipped wind-direction-vane, said ailerons lift the vane and the frustum body cam assemblies in winds of intolerable velocities to feather all blades simultaneously, each of said cam assembly bodies having been machined or cast with a circular space inside, around the interior, outwardly from the sleeve for housing horizontal cam follower wheels, said space open at the bottom and extending the greater distance upwardly toward the top of the conical body, the inner and outer walls of said space elevationally parallel one to the other and angular to the vertical shaft in an outwardly upward direction, there being a cam lobe forming a part of the upper section of the outer wall of the cam-follower track space and confronted by a matching depression in the opposite or inner wall forming a detour from the otherwise circular space of the cam-follower track permitting an inward horizontal diversion from the otherwise circular travel of the cam-follower wheels, each wheel supported in a horizontal position and propelled by a rigid linkage of rods which are attached to the inner end of a slidable bar supported in apertured supports which are attached to a radial arm of the windmill, the cam-follower wheel, the rod linkage and the slidable bar constituting the linkage to a hinged upwardly pivotal blade-stop latch at the bar's outer end removable from its engagement with the power blade by being withdrawn horizontally as a result of the cam-follower being deflected from its circular course as it passes the cam in the cam assembly and pulling said linkage inwardly, all said assemblies in conjunction one with the others in duplicate at the top and bottom of the blade space, the linkage assemblies propelled by the radial arms as the windmill rotates, an alternative disengagement of the latches from the power blades is initiated by an upward lift of the outer end of the latches clearing inward extensions of the upper and lower framing bars of each of the power blades, said latches movable upwardly in elongated slots in apertured supports attached to the radial arms, said latches lifted by flexible linkages with the movable iron cores of a pair of electric solenoids mounted on the radial arms, both the top and bottom solenoids of the pair energized simultaneously by parallel circuitry as an automatic consequence of malfunction of the horizontal sliding of either the top or bottom linkage assembly, the solenoids' links lifts the outer end of the latches above their engagement with the power blades, the accuracy of either technique for feathering the blades at a predetermined point in the power angle of the blade travel is regulated by the proper adjustment of the relationship of the cam assemblies to the large wind trailing vane or rudder positioning the cams in relation to the wind direction, said rudder clamped to the sleeves of said cam assemblies to swivel on their support collars to effect a constant cam-to-wind relationship and the circuit electrodes attached to the side of the cam assembly bodies adjusted to make timely synchronized contacts in the solenoid circuit to conductor-plates mounted upon the top side of the first lateral rod of the top and bottom linkage assemblies to operate a current connection a moment later than the point in time when the cam action is initiated, provided of course that the conductor-plate-part of the electrode-contact on either the top or bottom linkage rods has not become normally withdrawn by the cams' action before said electrical contact is made.

2. In a windmill as set forth in claim #1, a cam-activated linkage and blade-stop latch assembly for the top and bottom of each pair of the multiple of pairs of radial arms and blades is innovated to automatically release the blades to feather by the last significant wind pressure bearing thereon at a predetermined point in the power angle of the blade travel to guarantee a forward feathering of each blade individually in a direction of rotation opposite to the direction of rotation in which the windmill turns, an apparatus comprised of two sets of cam-follower wheels, each set housed in a cam-follower track of each set's cam assembly, a typical cam-follower wheel horizontally mounted on the upper end of a downwardly extending spring steel rod, through the open cam-follower conically shaped track space, to which is rigidly attached at the bottom end an outwardly laterally extending rod which in turn is rigidly adjoined to an upwardly extending rod of which the upper end is rigidly connected to a laterally extending bar, said bar slidably movable in apertured supports which are adjoined to and a part of the radial arm, said slidable bar having hinged at its outer end a bar potentially pivotal upwardly and constituting the blade-stop latch removable from engagement with the blade by a horizontal pull inwardly of the entire linkage assembly by the inward deflection of the cam-follower wheel belonging to the linkage unit when said wheel encounters the cam or, in lieu of said horizontal movement of the entire linkage, an upward lift of the outer end of the blade-stop latch can prevail to clear projections on the inner edge of the blade permitting the blade to feather, said lift effected by an electric solenoid with flexible linkage from its movable iron core to the latch bar, the vertical lift movement of the latch effecting an alternative release of the blade and automatically brought into action as a result of malfunction of the horizontal slide method of release by obstruction to movement caused by ice, a tree branch or other foreign interference utilizing the resilience over the resistance of the spring steel rod on which the horizontally mounted cam-follower wheel rests permitting the cam-follower to roll past the cam under the tension of the stress imposed upon the spring steel of its supporting rod even though the rest of the linkage is locked keeping the narrow electrical conductor-plate on the first lateral rod of the linkage remaining in line for electrical contact with the downwardly extending electrode attached to the cam assembly body, closing the circuit to, and energizing, the solenoids, the synchronization of the movement of the cam assemblies accounting for the simultaneous release of the top and bottom of the blade and the positive wires to the solenoids electrically adjoined accounting for the same ultimate function of release electrically if and when the electrical release becomes necessary.

3. In a windmill as set forth in claim #1, there is employed an emergency auxillary means to unlatch the blades to feather and automatically brought into use in the event of and by malfunction of the regular withdrawal of the linkage in the horizontal slide system disengaging the latches from the blade, a top and bottom electric solenoid for each blade employs an electric circuit to said solenoids, the circuit supplied by a power source outside the windmill, both upper and lower solenoids in each pair wired in parallel and their positive wires electrically adjoined to the circuit for simultaneous energizing and grounded to the superstructure of the windmill, said structure constituting an electric conductor for the negative side of the circuit, each pair of solenoids typically located on a top and bottom radial arm of the windmill which supports one blade in the windmill assembly, the solenoids optionally positioned under or over the hinged blade-stop latches, said latches being lifted upwardly by flexible linkage from the solenoids' movable iron cores, ends of said latches being lifted from in front of projections on the inner edge of the wind pressure bearing blade releasing same to feather forward only when solenoids are energized by the completion of the circuit as follows: from the negative side of the electric power source a wire to a carbon brush or current conductor roller suitably mounted from the base of the windmill and insulated from its holder, said current conductor held in tension against a slip-ring mounted around the tubular center shaft of the windmill and grounded thereto completes the negative side of the circuit to the structure-grounded solenoids while from the source of power the positive side of the circuit is connected likewise to a slip-ring in similar manner except said slip-ring is insulated from the tubular center shaft and electrically connected to two identical slip-rings above the lower radial arms by a wire ascending through the hollow of the center shaft with appropriate apertures in the surface of the shaft for the transit of shunt wires, said upper two slip-rings mounted around the shaft and insulated therefrom, one immediately under the lower cam assembly body and above the lower radial arms, the other slip-ring immediately under the lower extremity of the sleeve from the upper cam assembly body around or under its supporting collar, each of said bodies equipped with a contact brush or roller current-connector supported in a cage and insulated therefrom, said brush or roller cage affixed to the cam assembly body or to the bottom of the sleeve in the case of the upper assembly in a manner to hold the connector to the slip-rings under pressure tension as the shaft turns in the sleeves or as the cam bodies with their sleeves swivel about the center shaft, each of said connectors further connected electrically by a wire to a second connector adjustably mounted in a strategic location on the side of the cam assembly frustum body and insulated therefrom, downwardly extended to contact a laterally narrow conductor-plate mounted on the top side of the first lateral rod of each of the linkage assemblies and insulated therefrom, as the linkages pass under the downwardly extended connector-electrode, electrical contact is made provided of course that a malfunction of the slide mechanism has occurred keeping the conductor-plate in its circular line of travel to contact the current carrying overhead electrode from the cam assembly body sending a current from the electrode through the conductor-plate, thence through a flexible wire held by a holding clip on the radial arm and on to the solenoids; if no malfunction has occurred such as blockage of movement of the linkage by ice, tree branch or other foreign obstruction the conductor-plate is withdrawn with the linkage thus making no contact with the electrode, no current flows accordingly and the solenoids remain inactive, there being no necessity of feathering the blades by electrical means, however, a system of feathering all the blades simultaneously by the electrical solenoid means is adaptable to further use in augmenting the mechanical storm protection of the windmill by a simple wire from the positive side of each of the solenoids transiting openings in the wall of the tubular center shaft and continuing through the center shaft to emerge near the bottom, each wire terminating in a ring of insulation material loosely encircling the shaft, each terminal insulated from the rest and held in the ring with a spring tension giving all terminals a pressure contact to the positive circuit slip-ring when pressed thereto manually energizing all solenoids, feathering all blades and bringing the windmill to a stop in any velocity wind, said manual switch operable also by a wind pressure sensor to be activated by gusts or sustained high winds of such velocity as to threaten the entire windmill structure.

4. In a windmill as set forth in claim #1, there is provided a wind rubber or vane having means at its top and bottom upwind corners to clamp said vane to the sleeves of the two cam assemblies, said clamping accomplished by two confronting half circle heavy bands with plate appendages for bolting the half circle bands tightly around the sleeve of the top cam assembly and a duplicate clamping system around the sleeve of the bottom cam assembly, a friction lining material around sleeves and clamped to guarantee against slippage, said vane rigid in construction especially of the front or upwind vertical edge and the top and bottom horizontal edges to guarantee perfect synchronization of the two cam assemblies movements one to the other around the center shaft of the windmill and the vertical movement likewise, said vane adjustable in its relationship to the cam assemblies by loosening and resetting the clamps to determine the desired position of the cam lobes within the cam assemblies in relation to the wind direction, said relationship to determine the point in relation to the direction of the wind at which each blade is feathered by the workings of the cam and linkage assemblies on the blade release latches, said rudder being large in surface area and free to swivel or rotate the cam assemblies three hundred sixty degrees about the center shaft by wind direction changes moving the vane to always trail downwind, said vane limited in size to less than the height of the space between the top and bottom linkage assemblies and less than the radial distance from the axis of the windmill to a point defining the circular travel of the inner edge of the power vanes on the power side of the windmill, vertical lifting of rudder by strong gusts or sustained winds of a predetermined excess velocity effected by ailerons mounted on both sides of the web of the directional rudder, such lifting causing all power blades to feather at the same time as further described in claim eighteen.

5. In a windmill as set forth in claim #4, a directional wind vane or rudder is to maintain the cams of the cam assemblies in a constant relationship to the direction the wind is blowing at any given time, said vane clamped to the cam assemblies and having a plurality of ailerons mounted on both sides of the vane hinged to the aileron mountings near the trailing edge of the vane, the forward edge of the ailerons heading into the wind slightly elevated above a horizontal line through the hinge but restrained from a full lift upward incline by a tension spring above the front section of the aileron bearing upwardly against a cupped plate rigidly affixed to the framework of the web of the vane, the spring resisting the wind lift pressure on said aileron until a strong gust or a sustained high velocity wind overcomes said resistance of the spring lifting the front of the aileron abruptly upward from the level of its hinge to receive the maximum uplift pressure of the wind lifting the entire wind vane and aileron assembly against its own weight and that of the attached cam assemblies with a force determined by the number of ailerons so positioned on the directional wind vane, said rising of the aileron-equipped directional vane and the two attached cam assemblies effects a displacement of the cam assembly frustum bodies upwardly around the cam followers to a lower and smaller diameter section of the cam follower track pulling all linkages and their attached blade latches inwardly releasing all blades to feather simultaneously permitting the windmill to come to a stop for the duration of the high velocity wind and returning to normal function as the cam assembly bodies are permitted to descend by gravity over the cam followers to the normal position where the cam effects the normal feathering, one blade at a time.

* * * * *